Feb. 23, 1926.

R. BROWN

COOKING OVEN

Filed August 18, 1921

1,574,467

Robert Brown, Inventor

Patented Feb. 23, 1926.

1,574,467

UNITED STATES PATENT OFFICE.

ROBERT BROWN, OF DONAGHMORE, IRELAND.

COOKING OVEN.

Application filed August 18, 1921. Serial No. 493,487.

*To all whom it may concern:*

Be it known that I, ROBERT BROWN, a subject of the King of Great Britain and Ireland, residing at Donaghmore, county Tyrone, Ireland, have invented certain new and useful Improvements Relating to Cooking Ovens, of which the following is a specification.

The present invention relates to cooking apparatus of the class that comprises a cooking chamber, a fuel burner, and thermostatic device adapted to control the supply of heat when a predetermined temperature has been reached.

According to the invention an improved thermostatic device is provided which comprises a thermostatic weight adapted to overbalance and fall when a predetermined temperature is reached, and adapted in falling to control the cock of the gas supply through simple mechanism. At the same time the thermostatic weight may cause the closing of a vent to retain, in the cooking apparatus, the heat already generated.

The invention will now be described with reference to the accompanying drawings in which:—

Figure 1:
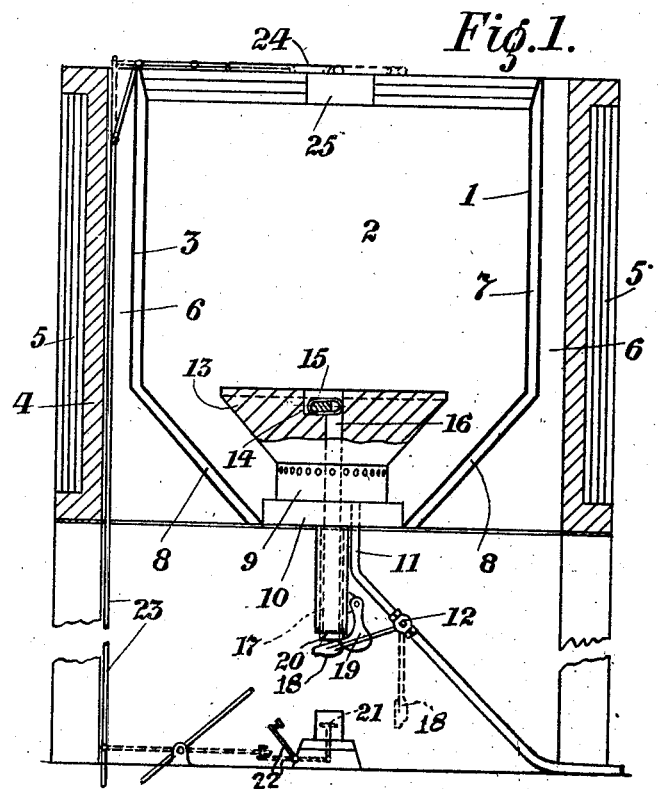
Fig. 1 is a sectional elevation of the cooking stove showing a thermostatic control of the heating means in accordance with my invention.
Figure 2:
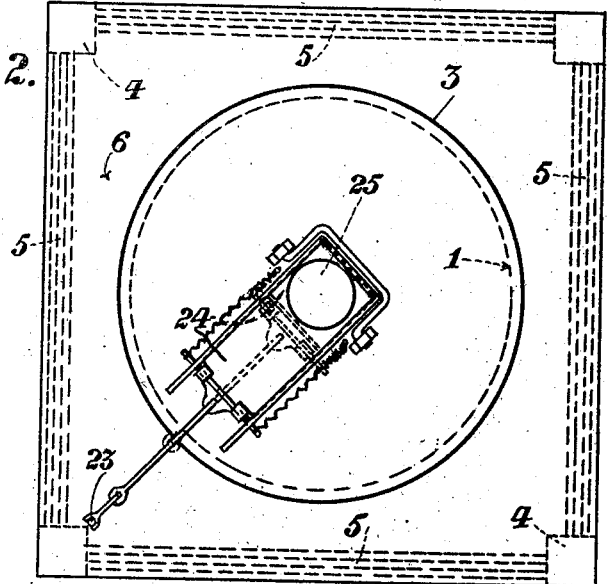
Fig. 2 is a plan view corresponding to Fig. 1.

The cooking apparatus comprises an inner shell 1 enclosing a cooking space 2, an intermediate shell 3 and an outer enclosing wall 4 having air spaces 5 therein. Between the wall 4 and the shell 3 is an air space 6 and between the shell 3 and the shell 1 is an air space 7. The lower portions 8 of the shells 1 and 3 are of conical shape, and within these portions is a gas burner chamber 9 above a hot air chamber 10; the gas to the burner is supplied through a jet 11, to which the gas is supplied through a cock 12. Above the gas burner chamber 9 is a heat storage block 13, shaped like an inverted truncated cone and having therein a chamber 14 opening into a vertical passage 16 leading through the gas burner chamber 9 to a guide tube 17. Pivoted to the lower end of the tube 17 is a latch 19 upon which the weighted lever 18 of the gas cock 12 is adapted to rest; in this position of the lever 18 shown in full lines in Fig. 1 the gas cock will be open. A tubular member 20 is located in the guide tube 17 and is arranged to slide therein, being held in uppermost position by the toe of the pivoted latch 19. Immediately below the member 20 is the end 21 of a lever 22 connected by a linkage 23 with a valve shutter 24 that controls the vent 25 from the top of the oven.

A thermostatic weight 15 is adapted to rest in the chamber 14 and to overhang partially the passage 16. This thermostatic weight 15 comprises a hollow tube of substantially oblong shape but with rounded ends, the tube being loaded with a piece of solid metal that will melt at a given temperature. The metal is normally at one end of the tube but on melting distributes itself evenly over the bottom of the tube and so changes the centre of gravity thereof and causes it to overbalance and fall down the passage 16.

The operation of the apparatus is as follows:—

When the gas cock 12 is open and the burner in operation, the heat from the latter will pass up round the outside of the block 13, and will heat the latter; from thence it passes upwards around the vessel to be heated which rests upon the said block. The block 13 is adapted to heat slowly and to retain its heat. As the block 13 heats, it will transfer heat to the thermostatic weight 15 and, consequently, the metal within the latter will be heated until it melts, when it will spread evenly over the bottom of the tube and will cause the latter to overbalance and fall down the passage 16 into the tubular member 20. This will cause the latch 19 to rock about its pivot and release the weighted lever 18 which will fall into the position shown in dotted lines in Fig. 1 and cut off the gas. Thus the goods in the cooker will be subject only to the heat contained therein and stored in the block 13.

The member 20, after the latch 19 has moved from below it, will fall until it strikes the end 21 of the lever 22 which will move the shutter 24 to close the vent 25 and so retain the heat in the cooking space 2. When the member 20 with the thermostatic weight 15 comes to rest, the latter will be resting on its end, and consequently the metal will run to that end and will, on cooling, solidify there so that the weight will be in position to act correctly when replaced in the chamber 14. When it is desired to re-set the apparatus for further operation this is done by hand.

Having now fully described my invention what I claim and desire to secure by Letters Patent is:—

1. In a cooking apparatus having a cooking chamber, and a fuel burner, a thermostatic control device comprising a support, a thermostatic weight resting thereon and adapted when heated to a predetermined degree to overbalance and fall therefrom, a guide to receive and guide said thermostatic weight during its fall, a pivoted latch adapted to be moved by said thermostatic weight during its fall, and a fuel control lever adapted to be normally held by the said latch and arranged to be moved on movement of said latch to cut off the fuel supply.

2. In a cooking apparatus having a cooking chamber, and a fuel burner, a thermostatic control device comprising a support, a thermostatic weight resting thereon and adapted when heated to a predetermined degree to overbalance and fall therefrom, a tubular guide to receive and guide said thermostatic weight during its fall, a pivoted latch adapted to be moved by said thermostatic weight during its fall, and a fuel control lever arranged to be moved on movement of said latch to cut off the fuel supply, a sliding member in said guide adapted to receive and move downwards with the falling thermostatic weight, a pivoted stop arranged in the path of said member, a system of linkage between said stop and a shutter, whereby on the fall of the thermostatic weight the shutter is moved to close a vent in the cooking chamber.

3. A cooking apparatus having in combination a cooking chamber, a fuel burner, a heat storage block arranged to be heated by the burner and having a chamber formed therein and a guide tube communicating with said chamber, a thermostatic weight resting in said chamber but adapted when heated to a predetermined degree to overbalance into said guide tube, a latch pivoted to said guide tube and projecting under the open end of same to be moved by the fall of the thermostatic weight, a fuel control lever supported by said latch and adapted to move to cut off the fuel supply when said latch is moved by the fall of the thermostatic weight.

4. A cooking apparatus having in combination a cooking chamber, a fuel burner, a heat storage block arranged to be heated by the burner and having a chamber formed therein and a guide tube communicating with said chamber, a thermostatic weight resting in said chamber but adapted when heated to a predetermined degree to overbalance into said guide tube, a latch pivoted to said guide tube and projecting under the open end of same to be moved by the fall of the thermostatic weight, a fuel control lever supported by said latch and adapted to cut off the fuel supply when said latch is moved by the fall of the thermostatic weight, a sliding member in said tube adapted to receive and move downwards with said falling thermostatic weight, a pivoted stop arranged in the path of said member, a system of linkage between said stop and a shutter, whereby on the fall of the thermostatic weight the shutter is moved to close a vent in the cooking chamber.

In testimony whereof I affix my signature.

ROBERT BROWN.